July 10, 1962 L. THOUREL ET AL 3,044,057
IMPROVEMENTS IN MONOPULSE MOVING TARGET INDICATORS
Filed Dec. 24, 1958

United States Patent Office 3,044,057
Patented July 10, 1962

3,044,057
IMPROVEMENTS IN MONOPULSE MOVING TARGET INDICATORS
Leo Thourel and Guy Le Parquier, Paris, France, assignors to Compagnie Generale de Telegraphie sans Fil, a corporation of France
Filed Dec. 24, 1958, Ser. No. 782,796
Claims priority, application France Dec. 27, 1957
5 Claims. (Cl. 343—7.7)

The present invention relates to moving target indicators.

Radar operators are often interested in echoes reflected by mobile objects only. In this case, echoes due to stationary objects must be eliminated as completely as possible. Many techniques have been devised to this end.

However, in gunfire control radar systems, whose operation may be affected by echoes from fixed objects at the same distance as the targets aimed at, conventional techniques are sometimes hardly applicable due to the complicated radar circuitry and because of the high level of the false echoes at the operating frequencies of this type of radar.

It is therefore an object of the invention to provide a system for eliminating, in gunfire control radar systems of the "monopulse" type, fixed echoes from objects located at a distance close to that of the desired mobile targets, the other echoes being normally eliminated by means of the conventional distance tracking window or gate signals.

According to the invention, the recurrent radar pulses are transmitted by pairs and the monopulse radar is provided with "sum" and "difference" channels of a particular type. Each channel comprises, a frequency changer, an intermediate-frequency amplifier and a summation circuit coupled to this amplifier both through a phase shifter and through a delay line.

Signals appearing in the summation circuit, which, being of no use for obtaining the desired information, may be considered as parasitic, can be eliminated by means of a coincidence circuit which effects the product of the signals at the input and at the output of delay line in the "sum" channel.

The invention will be best understood from the ensuing description and the appended drawings wherein:

FIG. 1 diagrammatically shows the conventional arrangement of the respective mouths of the four energizing horns of a monopulse radar system;

For a better understanding of the invention, the operation of a conventional monopulse radar system will be first briefly recalled.

Figure 1:
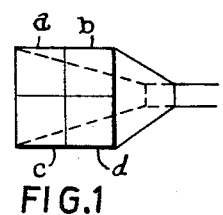

The aerial used comprises, for instance, four horns, the mouths of which are arranged adjacent one another, as illustrated at $a$, $b$, $c$, and $d$ in FIG. 1, and are located in the focal area of a paraboloid reflector, not shown. As known in the art, this reflector is arranged to reflect in predetermined directions the ultra-high frequency energy transmitted respectively by said horns.

A T-R switch, operating at ultra high frequency and comprising, for example, a system of hybrid junctions such as, for example, magic Tee's, enables the energy transmitted or received by the four horns to be combined according to different patterns.

For transmission, the fours horns, $a$, $b$, $c$, and $d$ are fed in phase and radiate according to a single pencil-beam pattern, the axis of which coincides with the axis of symmetry of the system, which is generally the axis of revolution of the parabolic reflector and is to be brought permanently to coincide with the line of sight of the target.

For reception, the energy received by these horns is combined in several ways and the signals respectively resulting from these combinations are treated in three different channels: a sum channel, an elevation channel and an azimuth channel.

The "sum" channel collects the "sum" $(a+b+c+d)$ of the signals respectively collected by the four horns, $a$, $b$, $c$ and $d$ respectively designating the signals collected by the horns having the same reference. This signal is a reference signal corresponding to an axially directed pattern similar to the transmission pattern. This channel may be considered as the equivalent of the reception channel of conventional radar systems.

The "elevation" and the "azimuth" channels respectively provide error signals, i.e. signals indicating the extent to which the actual pointing direction is off the desired pointing direction in elevation and azimuth. Such error signals result from the intersection of reception patterns of the four horns combined by pairs as well known in the art.

The elevation channel provides a signal obtained by combining the signals respectively collected by the four horns according to the relation $(a+b)-(c+d)$. The signal from the azimuth channel is the signal corresponding to the relation $(a+c)-(b+d)$.

The error signals thus obtained provide by comparison with the reference signal of the "sum" channel, an error signal the amplitude of which is a function of the pointing error angle and whose polarity depends on the direction of this angle with respect to the axis of symmetry of the aerial. Target tracking can thus be effected by means of conventional servo systems.

The operating principle of the system according to the invention will now be outlined.

Pairs of recurrent ultra-high frequency pulses I and II are transmitted in a known manner and echoes thereof collected. It will be assumed that these echoes are reflected by a mobile object and by a stationary object substantially at the same distance from the radar.

For the sake of clarity the signals collected by the "sum" channel of the radar and those collected by only one of the "difference" channels, i.e. the elevation or the azimuth channel, will be considered. The diagram or the operations effected on these signals is shown in FIG. 2 it being understood that the amplitude of the vectors is the amplitude of the reflected pulsed ultra high frequency energy, and the phase of these vectors is the phase of said ultra high frequency energy.

The vectors corresponding respectively to the echo signals provided by the "sum" channel and by the "difference" channel are termed the "sum" vector and the "difference" vector, respectively. Echoes from fixed and mobile targets will be called fixed and mobile echoes respectively.

Figure 2:
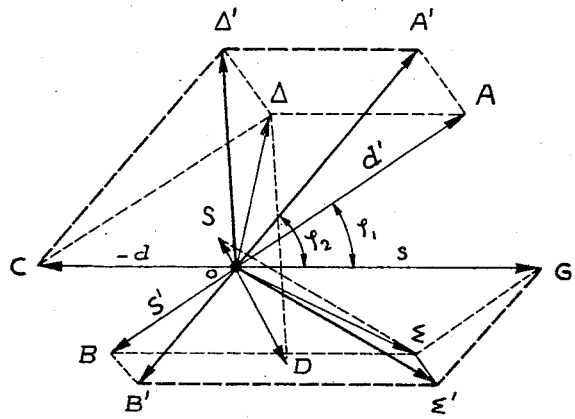
FIG. 2 is a vector diagram of received signals.

Considering the first pulse, i.e. pulse I, of one recurrent pair of pulses, the following vectors may be represented on the diagram in FIG. 2:

$\overrightarrow{OG} = s$: the sum-vector relating to the fixed echo;

$\overrightarrow{OC} = -d$: the difference vector relating to the same fixed echo;

$\overrightarrow{OB} = s'.e^{j(\varphi_1+\pi)}$: the sum vector relating to the mobile echo;

$\overrightarrow{OA} = d'.e^{j\varphi_1}$: the difference vector relating to the mobile echo. Vector $OG$ is taken as the origin of the phases, i.e. its phase is taken as zero.

Phase $\varphi_1$ between the fixed echo and the mobile echo may of course have any value.

It will now be assumed that the second pulse, or pulse II, is not very remote in time from the first one, which is generally the case in practice.

Under these circumstances, the respective amplitude of the fixed and the mobile echoes relating to the second pulse will be the same as for the first pulse. The vector corresponding to the fixed echo keeps the same phase, while the vector correspond to the mobile echo occurs with a different phase $\varphi_2$. This is the consequence of the distance covered by the moving body during the time interval between said pulses. The voltage collected respectively in the two channels considered may therefore be represented by vectors:

$$\overrightarrow{OA'} = d'.e^{j\varphi_2} \text{ and } \overrightarrow{OB'} = s'.e^{j(\varphi_2+\pi)}$$

The signal collected at the output of the sum channel as a result of the first pulse, is shown by vector:

$$\overrightarrow{\epsilon} = \overrightarrow{OB} + \overrightarrow{OG} = s'.e^{j(\varphi_1+\pi)} + s \quad (1)$$

and the signal collected as a result of the second pulse, by vector:

$$\overrightarrow{\epsilon'} = \overrightarrow{OB'} + \overrightarrow{OG} = s'.e^{j(\varphi_2\pi)} + s \quad (2)$$

At the output of the difference channel, the corresponding signals are:

$$\overrightarrow{\Delta} = \overrightarrow{OA} + \overrightarrow{OC} = d'e^{j\varphi_1} - d \quad (3)$$

$$\overrightarrow{\Delta'} = \overrightarrow{OA'} + \overrightarrow{OC} = d'e^{j\varphi_2} - d \quad (4)$$

Now, carrying out the vectorial differences of the resulting signals, the following expressions are respectively obtained for the sum channel and for the difference channel.

$$\overrightarrow{S} = \overrightarrow{\epsilon} - \overrightarrow{\epsilon'} = s'(e^{j\varphi_1} - e^{j\varphi_2}) \quad (5)$$

$$\overrightarrow{D} = \Delta - \Delta' = d'(e^{j\varphi_1} - e^{j\varphi_2}) \quad (6)$$

It is apparent from Equations 5 and 6 that vectors S and D are parallel and that the ratio between these signals is:

$$\frac{D}{S} = \frac{d'}{s'} \quad (7)$$

Since D and S are proportional to signals $s'$ and $d'$, all the conventional operations, carried on in monopulse radar techniques on the output voltages of the sum and the difference channels in order to extract therefrom the desired information, can be performed on S and D, thus avoiding any interference from the fixed echo signals.

Of course, the respective phases of the various vectors must be taken account when effecting subtractions, since these operations are of vectorial nature. Consequently, such operations will have to be carried out at the intermediate frequency stage output.

Figure 3:
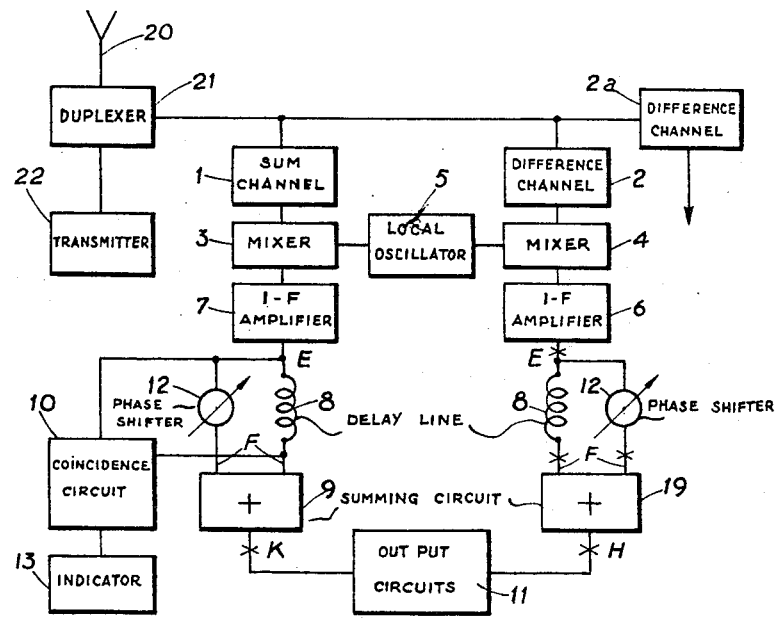
FIG. 3 is a block diagram of a radar system according to the invention.

FIG. 3 illustrates an embodiment of a monopulse radar system according to the invention.

The circuit shown in this figure comprises the conventional sum and difference channels 1, 2 and 2a of a monopulse radar system, only one of the difference channels having been shown in some detail since the two difference channels are entirely similar. Channels 1, 2 and 2a receive from an aerial 20 and through a duplexer 21 the echoes of pulse signals radiated in pairs by the radar transmitter 22.

The ultra high frequency output signals of channels 1 and 2 are converted into intermediate frequency signals in respective mixers 3 and 4 where they are mixed with the output of a frequency stabilized local oscillator 5. Mixers 3 and 4 feed respective intermediate frequency preamplifiers 6 and 7 which in turn feed respective summation circuits 9 and 19 through respective assemblies comprising a delay line 8 and a phase shifter 12 in parallel.

Delay lines 8 are of a conventional type and apply to the signals which pass therethrough a delay equal to the period separating the two pulses of a same pair. Phase shifters 12 provide a phase shift equal to $\pi$. The voltages collected at the respective outputs of circuits 9 and 19 represent vectors S and D in accordance with Equations 5 and 6 i.e. vectors $S = \epsilon - \epsilon'$ and $D = \Delta - D'$, $\epsilon$, $\epsilon'$, $\Delta$ and $\Delta'$, having been defined above. The phase shift equal to $\pi$ applied to the signals corresponding to the second pulse has for consequence that the summing circuits 9 and 19 provide signals which are the differences between said signals.

In addition, the sum channel 1 comprises a coincidence circuit 10, connected at E to the output of amplifier 7, and at F to the output of the delay line 8, as shown in the figure, and a distance indicator 13 coupled to circuit 10. This distance indicator 13 is of any conventional type (scope of the P.P.I., A or J type) and provides the distance indication of the moving objects.

Figure 4:
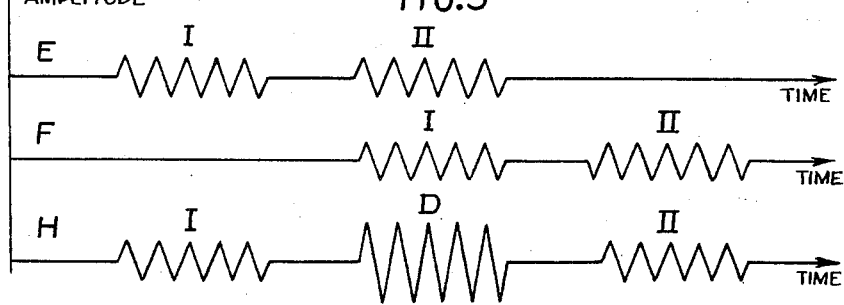
FIG. 4 illustrates diagrammatically voltages obtained at different points of the system of FIG. 3.

FIG. 4 shows the voltages at various points of one of the two channels shown in FIG. 3, namely the difference-channel 2.

It is assumed, as is generally the case in practice, that, in order to increase the sensitivity of the system, the time interval separating the two pulses I and II of a same pair has been selected in such a manner that a target moving at the mean radial speed of the desired operating speed ranges will cover within this time interval a distance equal to a quarter of the operating wave-length. Consequently, the echoes obtained from such a target for two pulses of a same pair will be in phase opposition.

Owing to the action of phase-shifter 12 and delay line 8, these voltages will thus be in phase at the input F of the summation circuits 9 or 19.

FIG. 4 shows the two echo pulses I and II at E corresponding respectively to $\Delta$ and $\Delta'$ of Equations 3 and 4. After having been delayed in line 8, pulse I appears at F at the same time as a pulse II, these two pulses being in phase. They are combined and summed in circuit 19, thus providing at the output H thereof a pulse D which is the difference $\Delta - \Delta'$ of Equation 6 which is preceded and followed by pulses I and II which are undesired.

In the same way, a pulse S which is the difference $\epsilon - \epsilon'$ of Equation 5 occurs at the output K of the sum channel.

These signals, which contain all the information contained in vectors OA and OB, OA' and OB', i.e. the information concerning the elevation of the azimuth of the moving object, as shown above, are then handled in conventional monopulse radar output circuits 11 according to the conventional technique of the "monopulse" radars systems providing the ratio $$\frac{D}{S}$$

in order to extract therefrom the desired information this circuit 11, which is entirely conventional, is, for example, a logarithmic amplifier. Its output provides an error voltage proportional to the azimuth or to the elevation of the moving object.

Indicator 13 receives pulses arriving simultaneously at F i.e. pulses I and II of line E (FIG. 4) and pulses I and II of line F (FIG. 4).

The pulses II of line F and I of line E, which occur simultaneously, give the desired distance indication relating to the moving objects. Pulses I of line E and II of line F are parasitic and undesired pulses. The elimination of the undesired pulses on indicator 13, provided in addition to conventional monopulse radar output circuits, is easily obtained by following a conventional technique: it suffices to this end to multiply together in a coincidence circuit 10, inserted between intermediate frequency amplifier 7 and indicator 13, signals respectively occurring at the input E and at the output F of delay line 8 of the sum channel.

In this way, only the desired signal appears on indicator 13, while the undesired signals, immediately preceding and following this signal, are eliminated.

It is to be understood that the invention is not limited to the embodiment described and illustrated, which is given only by way of example.

What is claimed is:

1. In a monopulse radar having means for transmitting pulsed signals, means for receiving echo of said signals including a sum channel and at least one difference channel and radar output circuits for providing the ratio of signals in said channels: means for transmitting said pulses by recurrently repeated pairs, the pulses of each pair being separated by a short time interval, two successive pairs of pulses being separated by a time interval which is long with respect to said short interval; and, between each of said channels and said output circuits, an intermediate frequency stage coupled to a respective one of said channels, a delay line for delaying said echo of said signals by said short time interval, phase shifting means for providing a predetermined phase shift, and a summing circuit; the delay line and the phase shifter associated with each stage being coupled in parallel between the associated intermediate frequency stage and the associated summing circuit.

2. In a monopulse radar system having means for transmitting pulse signals, meeans for receiving echoes of said pulse signals, including a sum channel, at least one difference channel and angular error responsive means: means for transmitting said pulse signals by recurrently repeated pairs, the pulse signals of each pair being separated by a short time interval, two successive pairs of pulse signals being separated by a long time interval; and, connected between each of said channels and said angular error responsive means, means for summing up said echoes corresponding to two pulse signals of a pair of transmitted pulse signals.

3. In a monopulse radar system having means for transmitting pulse signals and an operating wavelength, including a sum channel, at least one difference channel and angular error responsive means, for providing the ratio of signals in said channels: means for transmitting said pulse signals by recurrently repeated pairs, the pulse signals of each pair being separated by a first time interval, during which a target, moving at a predetermined speed, covers a distance substantially equal to a quarter of said operating wavelength, two successive pairs of pulse signals being separated by a second time interval which is long compared to said first time interval; and, between each of said channels, and said responsive means, an intermediate frequency stage coupled to said channel; a summing circuit; and coupled in parallel between said intermediate frequency stage and said summing circuit; a delay line for delaying said echo signals by a time interval equal to said first time interval and phase shifting means for providing a phase shift equal to $\pi$.

4. In a monopulse radar system having means for transmitting pulsed signals and an operating wavelength, means for receiving echoes of said signals, including a sum channel, at least one difference channel, and angular error responsive means for providing the ratio of signals in said channels: means for transmitting said pulse signals by recurrently repeated pairs, the pulse signals of each pair being separated by a first time interval, during which a target, moving at a predetermined speed, covers a distance substantially equal to a quarter of said operating wavelength, two successive pairs of pulse signals being separated by a second time interval which is long compared to said first time interval; and between each of said channels and said responsive means, an intermediate frequency stage coupled to said channel, a summing circuit and coupled in parallel between said intermediate frequency stage and said summing circuit: a delay line having an input and an output for delaying said echo signals by a time interval equal to said first interval and phase shifting means for providing a phase shift equal to $\pi$, a coincidence circuit, coupled to said input and said output of said delay line for collecting the input signal and the output signal of said delay line coupled to said sum channel, for multiplying said signals by each other, and one indicator circuit coupled to said coincidence circuit.

5. In a monopulse radar system having means for transmitting pulsed signals and an operating wavelength means for receiving echoes of said signals including a sum channel and at least one difference channel, and angular error responsive means for providing the ratio of signals in said channels; means for transmitting said pulse signals by recurrently repeated pairs, the pulse signals of each pair being separated by a first time interval, during which a target moving at a predetermined speed, covers a distance substantially equal to a quarter of said operating wavelength, two successive pairs of pulse signals being separated by a second time interval which is long compared to said first time interval, and between each of said channels and said responsive means, an intermediate frequency stage coupled to said channel and a summing circuit, and coupled in parallel between said intermediate frequency stage, and said summing circuit: a delay line having an input and an output for delaying said echo signal by a time interval equal to said first interval; phase shifting means for providing a phase shift equal to $\pi$; a coincidence circuit, coupled to said input and said output of said delay line for collecting the input signal and the output signal of said delay line coupled to each of said channels, for multiplying said signals by each other, and one indicator circuit coupled to said coincidence circuit.

References Cited in the file of this patent
UNITED STATES PATENTS

| | | |
|---|---|---|
| 2,631,279 | Bollinger | Mar. 10, 1953 |
| 2,687,520 | Fox | Aug. 24, 1954 |
| 2,759,154 | Smith | Aug. 14, 1956 |